United States Patent
Willis et al.

(10) Patent No.: US 6,462,143 B1
(45) Date of Patent: Oct. 8, 2002

(54) GEL-FREE PROCESS FOR MAKING FUNCTIONALIZED ANIONICALLY POLYMERIZED POLYMERS

(75) Inventors: Carl Lesley Willis, Houston, TX (US); Daniel Earl Goodwin, Katy, TX (US); Robert Charles Bening, Katy, TX (US); Dale Lee Handlin, Jr., Houston, TX (US); John David Wilkey, Houston, TX (US)

(73) Assignee: KRATON Polymers US LLC, Houston, TX (US)

( * ) Notice: Subject to any disclaimer, the term of this patent is extended or adjusted under 35 U.S.C. 154(b) by 0 days.

(21) Appl. No.: 09/234,335

(22) Filed: Jan. 20, 1999

Related U.S. Application Data

(60) Provisional application No. 60/073,592, filed on Feb. 3, 1998.

(51) Int. Cl.[7] ................ C08F 8/42; C08F 4/46
(52) U.S. Cl. ............... 525/370; 525/330.3; 525/333.1; 525/333.2; 525/333.3; 525/344; 525/361; 525/375; 525/383; 525/385; 525/409; 525/415; 525/461; 526/173
(58) Field of Search ................ 526/177, 173; 525/361, 370, 385, 333.1, 333.2, 330.3, 333.3, 344, 383, 375, 409, 415, 461

(56) References Cited

U.S. PATENT DOCUMENTS

| | | | |
|---|---|---|---|
| 3,350,380 A | * 10/1967 | Strobel | 525/370 X |
| 4,480,075 A | 10/1984 | Willis | 525/247 |
| 4,518,753 A | 5/1985 | Richards et al. | 526/177 |
| 4,835,220 A | * 5/1989 | Bronstert et al. | 525/370 X |
| 5,063,190 A | 11/1991 | Hargis et al. | 502/157 |
| 5,202,499 A | 4/1993 | Hargis et al. | 568/587 |
| 5,216,181 A | 6/1993 | Hargis et al. | 549/513 |
| 5,397,851 A | 3/1995 | Knauf et al. | 526/92 |
| 5,412,045 A | 5/1995 | Osman et al. | 526/133 |
| 6,103,846 A | 8/2000 | Willis et al. | 526/335 |

OTHER PUBLICATIONS

Ser. No. 09/260,239 filed Mar. 2, 1999 (allowed claims).
Ser. No. 09/304,915 filed May 4, 1999 (allowed claims).
"Solid–State NMR of Aromatic Polyamides," by S. A. Curran, C. P. LaClair, and S. M. Aharoni, *Macromolecules* 1991, 24, pp. 5903–5909.

\* cited by examiner

*Primary Examiner*—Fred Teskin

(57) ABSTRACT

This invention relates to a gel-free process for making functionalized polymers. When multi-alkali metal initiators are used to make these polymers anionically, the process comprises anionically polymerizing at least one monomer with a multi-alkali metal initiator in a hydrocarbon solvent, capping the polymer by adding to the polymer a capping agent that reacts with the ends of the polymer chains such that strongly associating chain ends are formed wherein a strongly associating gel is formed, and, finally, adding a trialkyl aluminum compound to the gel. The important characteristic of the capping agent herein is that it will cap the living polymer and will add a functional group to the polymer chain end which will be strongly associating in the hydrocarbon solvent. In a second embodiment, the present invention relates to a process for making such polymers which comprises anionically polymerizing them as described and adding to the polymer a trialkyl aluminum compound before the alkali metal reacts with the capping agent-functionalized chain ends. Finally, the polymer is capped by adding the above-described capping agent. In the first embodiment, a gel is formed and then removed. In the second embodiment, the gel never is formed because of the presence of the trialkyl aluminum compound.

58 Claims, No Drawings

GEL-FREE PROCESS FOR MAKING FUNCTIONALIZED ANIONICALLY POLYMERIZED POLYMERS

This application claims the benefit of U.S. Provisional Application No. 60/073,592, filed Feb. 3, 1998, the entire disclosure of which is hereby incorporated by reference.

FIELD OF THE INVENTION

This invention relates to a gel-free process for making functionalized polymers, primarily functionalized anionic polymers which are made using multi-lithium initiators. More particularly, this invention relates to a gel-free process for making polydiene diols.

BACKGROUND OF THE INVENTION

Functionalized anionically polymerized polymers of conjugated dienes and other monomers wherein the functionalization is terminal and/or internal are known. Particularly, U.S. Pat. No. 5,393,843 describes polybutadiene polymers having terminal functional groups. One of the methods described for making such polymers involves anionic polymerization utilizing a dilithium initiator such as the adduct derived from the reaction of m-diisopropenylbenzene with two equivalents of s-BuLi. Monomer is added to the initiator in hydrocarbon solution and anionic living polymer chains grow outwardly from the ends of the dilithium initiator. These polymers are then capped to form functional end groups as described in U.S. Pat. Nos. 4,417,029, 4,518,753, and 4,753,991. Of particular interest herein are terminal hydroxyl, carboxyl, sulfonate, and amine groups.

It has been observed that when the living polymer is reacted with the commonly available "capping" agents, the polymer in the hydrocarbon solution forms a gel. For purposes of this invention, a polymer gel is defined as a blend of a polymer and a hydrocarbon solvent that has a yield stress, that is, it will not flow unless it is acted on by at least some critical stress. A polymer gel as defined herein will require a significant application of force in order to initiate flow through an orifice. Of particular interest are gels that will not flow under the force of their own weight. The presence of gel that will not flow under the force of its own weight is readily detected by visual observation. This effect is observed by inverting a bottle containing the solution to see whether it flows to the bottom of the inverted flask. Gelled solutions will not readily flow to the bottom of the bottle.

The physical characteristics of these gels make them more difficult to handle in equipment which is designed for moving, mixing, or combining freely flowing liquids, i.e. materials without a significant yield stress. Pumps, reactors, heat exchangers, and other equipment that are normally used for making polymer solutions that can be characterized as viscous fluids are not typically suited to handling polymer gels. Thus, one would expect that processing equipment likely to be found at a manufacturing location that is designed to handle liquid polymer solutions, as defined above, would be ill suited to handling gels of this nature.

Without limiting the invention thereto, we offer the following theory as to why this gelation occurs. We believe that gelation results from the strong association of the "capped" polymer chain ends in the hydrocarbon solvents used, i.e., cyclohexanesldiethylether. In the case of an ethylene oxide capping agent, the polymer chain ends would be lithium alkoxides. In essence, these very polar lithium alkoxide sites interact strongly as they are formed and, in the nonpolar solvent, self-assemble into aggregates having multiple alkoxide centers. The association of alkoxide ends from multiple chains in a single aggregate provides a mechanism for network formation. Since the polymer chains each have two alkoxide ends, having the ends anchored in different aggregates leads to elastic properties, creating a gel as defined herein.

A suggested mechanism for the formation of a strongly associating gel in the case of a polybutadiene diol is as follows:

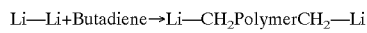

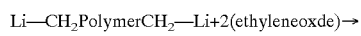

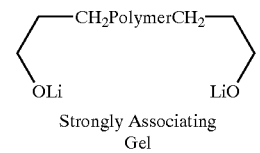

Strongly Associating Gel

The dilithium initiation technology discussed above has advantages over other technologies used to make functionalized anionically polymerized polymers including polydiene diols and polyols. For instance, U.S. Pat. No. 5,416,168 describes a process which utilizes a monolithium initiator which contains a protected functional center (Protected Functional Initiator) to make a polybutadiene mono-ol. The preparation of the initiator is complicated by the fact that the precursor to the initiator must contain the functional center that is desired in the final polymer and further that this center must be derivatized to make it inert to the chemistry used in making the C—Li bond in the initiator. Once the Protected functional initiator is prepared, it may be used to polymerize a suitable monomer such as butadiene. This process leaves the protected functional initiator on one end of the polymer chain and a living C—Li center on the other end of the chain. Optionally, the "living" end of the polymer chain may be reacted with a capping agent. If ethylene oxide is used as the capping agent, then a polybutadiene mono-ol is the product. These steps are then followed by a step of deprotecting the first functionalized polymer chain end. This chemistry frees the functionality on the other end of the polymer chain. Finally, the polymer product must be washed to remove the residue of the protecting agent and the residues of the reagent that were used to remove it.

It can be seen that a dilithium initiation process would be highly advantageous over such a protected functional initiator process in terms of elimination of process steps, cost, etc. The invention described herein is a process for producing terminally functional polymers using the di- or multi-organo alkali metal initiator method. This process for making terminally functional polymers avoids gel formation through the addition of "screening agents" which block or weaken the association of the polar functional moieties.

SUMMARY OF THE INVENTION

This invention relates to a gel-free process for making functionalized polymers. When multi-organo alkali metal initiators are used to make these polymers anionically, the process comprises anionically polymerizing at least one monomer with a multi-organo alkali metal initiator in a hydocabon solvent and then capping the polymer by adding to the polymer a capping agent that reacts with the ends of the polymer chains such that strongly associating chain ends are formed wherein a polymer gel is formed. The important characteristic of the capping agent herein is that it caps the living polymer and adds a functional group to the polymer chain end which will be strongly associating in the hydrocarbon solvent. The result of the association of the chain ends is that the solution will gel. The final step of the process is adding a trialkyl aluminum compound to the polymer gel which results in a freely flowing solution.

In a second embodiment, the present invention relates to a process for making such polymers which comprises anionically polymerizing them as described and then capping the polymer by adding the above-described capping agent. An aluminum trialkyl is added before or during polymerization or before or with the capping agent (i.e., before a gel can form—prior to any reaction of the alkali metal with the gel-forming functionality).

In the first embodiment, a gel is formed and then removed. In the second embodiment, the gel never is formed because of the presence of the trialkyl aluminum compound.

In a third embodiment, an unfunctionalized polymer is functionalized by lithiation and reaction with a capping agent of this invention, whereby a strongly associating gel is formed. A promoter such as triethylamine or tetramethylethylenediamine is necessary. In a fourth embodiment, an already functionalized polymer is reacted with $RLi_n$ (or an active Na or K compound) in order to convert to a different functionality. In both embodiments, the gel can be broken by addition of trialkyl aluminum to the gel or prevented by addition thereof prior to the reaction of Li (or Na or K) with the gel-forming functionality.

DETAILED DESCRIPTION OF THE INVENTION

This invention relates to functionalized polymers and processes for avoiding gel formation, especially when such polymers are made by anionic polymerization using di- or multi-alkali metal, generally lithium, initiators. Sodium or potassium initiators can also be used. For instance, polymers which can be made according the present invention are those from any anionically polymerizable monomer, especially including terminal and internal functionalized polydiene polymers, including random and block copolymers with styrene, polyether polymers, polyester polymers, polycarbonate polymers, polystyrene, acrylics, methacrylics, etc. Polystyrene polymers hereunder can be made in the same manner as the polydiene polymers and can be random or block copolymers with dienes.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their allyls, amides, silanolates, naphtalides, biphenyls or anthracenyl derivatives. It is preferred to use an organo alkali metal (such as lithium or sodium or potassium) compound in a suitable solvent at a temperature within the range from about −150° C. to about 150° C., preferably at a temperature within the range from about −70° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4. The organolithium initiators are preferred for polymerization at higher temperatures because of their increased stability at elevated temperatures.

Polyester polymers would be made by anionic polymerization of a cyclic ester such as a lactone. Caprolactone is frequently used. Polyether polymers would be made by anionic polymerization of a cyclic ether such as an epoxide. Ethylene oxide is frequently used. Polycarbonate polymers would be made by anionic polymerization of a cyclic carbonate. The cyclic carbonate of 1,3-propanediol may be used.

Functionalized polydiene polymers, especially terminally functionalized polybutadiene and polyisoprene polymers, optionally as copolymers, either random or block, with styrene, and their hydrogenated analogs are preferred for use herein. Especially preferred are polybutadiene diols. Such polymers are made as generally described above. One process for making these polymers is described in U.S. Pat. No. 5,393,843 which is herein incorporated by reference.

Using a polydiene diol as an example, butadiene is anionically polymerized using a difunctional lithium initiator such as the sec-butyllithium adduct of diisopropylbenzene as an example. The living chain ends are then capped with a capping agent such as described in U.S. Pat. Nos. 4,417,029, 4,518,753, and 4,753,991, which are herein incorporated by reference. There are many multilithium initiators that can be used herein. The di- s-butyllithium adduct of m-diisopropenylbenzene is preferred because of the relatively low cost of the reagents involved and the relative ease of preparation. Diphenylethylene, styrene, butadiene, and isoprene will also work well to form dilithium (or disodium) initiators by the reaction:

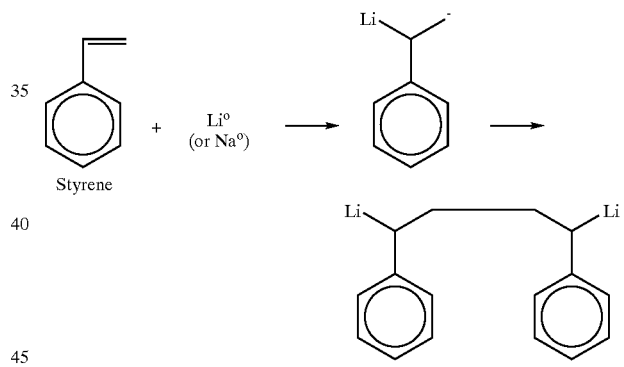

Still another compound which will form a diinitiator with an organo alkali metal such as lithium and will work herein is the adduct derived from the reaction of 1,3-bis (1-phenylethenyl)benzene (DDPE) with two equivalents of a lithium alkyl:

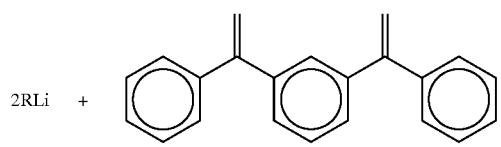

Related adducts which are also known to give effective dilithium initiators are derived from the 1,4-isomer of DDPE. In a similar way, it is known to make analogs of the DDPE species having alkyl substituents on the aromatic rings to enhance solubility of the lithium adducts. Related families of products which also make good dilithium initiators are derived from bis[4-(1-phenylethenyl)phenyl]ether, 4,4'-bis(1-phenylethenyl)-1,1'-biphenyl, and 2,2'-bis[4-(1- phenylethenyl)phenyl]propane (See L. H. Tung and G. Y. S. Lo, Macromolecules, 1994, 27, 1680–1684 (1994) and U.S. Pat. Nos. 4,172,100, 4,196,154, 4,182,818, and 4,196,153 which are herein incorporated by reference). Suitable lithium alkyls for making these dilithium initiators include the commercially available reagents (i.e., sec-butyl and n-butyl lithium) as well as anionic prepolymers of these reagents, polystyryl lithium, polybutadienyl lithium, polyisopreneyl lithium, and the like.

The polymerization is normally carried out at a temperature of 20 to 80° C. in a hydrocarbon solvent. Suitable solvents include straight and branched chain hydrocarbons such as pentane, hexane, octane and the like, as well as alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as dimethyl ether, methylethyl ether, diethyl ether, tetrahydrofuran and the like. The capping reaction is carried out in the same solution and usually at about the same temperature as the polymerization reaction, as a matter of convenience.

The general class of capping agents useful herein which form strongly associating chain ends and cause gelation are those which form alkali metal-O or alkali metal-N (preferably, LiO and LiN) bonds. Specific capping agents which are highly useful herein include ethylene oxide and substituted ethylene oxide compounds, oxetane and substituted oxetane compounds, aldehydes, ketones, esters, anhydrides, carbon dioxide, sulfur trioxide, aminating agents which form lithium imides, especially imines, and suitable reactive amine compounds like 1,5-diazabicyclohexane as described in U.S. Pat. No. 4,816,520 which is herein incorporated by reference. At least 0.1 mole of capping agent per mole of polymer chain end is necessary to give sufficient functionalization for most applications. It is preferred that from 1 to 10 moles of the capping agent per mole of polymer chain end be used in the capping of the polymer although the upper limit is only a practical one determined by cost benefit.

At this point in the process, the polymer forms a gel. A trialkyl aluminum compound is then added to this gel which then dissipates. The alternative process involves adding the trialkyl aluminum compound to the polymer mixture before the alkali metal reacts with the gel-forming functionality to form a gel. It may be added before, during, or after polymerization before the addition of the capping agent. In these cases, no polymer gel forms. If the trialkyl aluminum is added before or during polymerization, then less than a molar ratio of Al:Li of 1:1 should be added because the polymerization will stop if the ratio reaches 1:1. In yet another alternative, the trialkyl aluminum compound is added at the same time as the capping reagent. It may be premixed with the capping agent or just added to the reactor at the same time as the capping reagent. In this process, no polymer gel forms. Using triethyl aluminum as an example, it is believed that the mechanism of these two processes, adding the trialkyl aluminum reagent either before or after capping, is as follows:

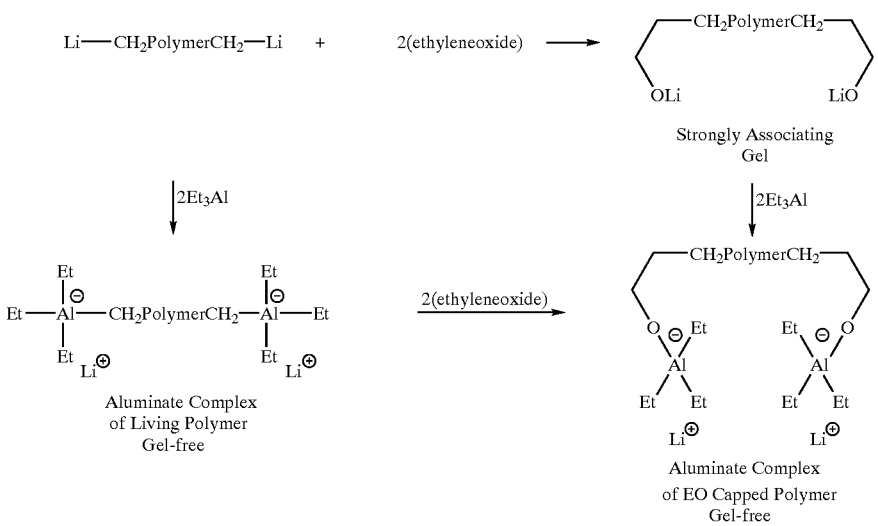

As described above, gel is avoided or removed by addition of a trialkyl aluminum compound. It is important that the chain end retains activity for nucleophilic substitution reactions after the "ate" complex has formed. Even after the trialkyl aluminum reagent has been added and the "ate" complex has formed, the chain end is still capable of further reaction. The trialkyl aluminum compounds used in the present invention are those wherein the alkyl groups contain from 1 to 10 carbon atoms. Preferred trialkyl aluminum compounds are triethyl aluminum, trimethyl aluminum, tri-n-propylaluminum, tri-n-butylaluminum, triisobutylaluminum, tri-n-hexylaluminum, and trioctyl aluminum because these reagents are readily available in commercial quantities. Triethylaluminum is most preferred as it is least expensive on a molar basis.

The molar ratio of the trialkyl aluminum compound to the polymer chain ends is generally at least 0.1:1, preferably 0.33:1 and most preferably 0.66:1 to 1:1 since this results in a freely flowing solution. If it is less than 0.1:1, then the level of reduction in gel is too low to give an observable reduction in either the shear stress or the viscosity of the solution. If the ratio is more that 1:1, then the cost goes up unnecessarily but the advantages are still achieved. It is advantageous to be able to use less aluminum for cost purposes.

This invention is also applicable in situations wherein an existing polymer is to be functionalized or wherein it is desired to convert the functionality of an already functionalized polymer using one of the gel-forming capping agents described herein.

For example, it is known to functionalize hydrogenated styrene-butadiene-styrene (SBS) block copolymers by first lithiating them by reaction with $RLi_n$ in the presence of a promoter such as triethylamine or tetramethylethylenediamine (TMEDA) as described in U.S. Pat. Nos. 4,868,243 and 4,868,245 which are herein incorporated by reference. A number of reactive $Li^+$ sites are formed in the styrene blocks. If these are reacted, for example, with $CO_2$, strongly associated gel forms. It may be broken by addition of trialylaluminum to the gel or prevented by such addition prior to addition of the $CO_2$ as described above.

Also, an existing polyol such as polybutadiene diol, for example, can be reacted in a hydrocarbon solution such as cyclohexane with KH to form the potassium alkoxide. Potassium alkoxides are known to rapidly polymerize ethylene oxide which would afford a route to a block copolymer having polyethylene oxide end blocks and a polybutadiene center block. At the start of such a synthesis, upon reaction of the polyol with the KH, a gel will form. Trialkylaluminum will break up the gel or prevent its formation as described above.

EXAMPLES

Example 1

Procedure for Preparation of a Diinitiated Butadiene Polymer at 10% Solids in a 1-Gallon Stainless Steel Autoclave Capping with Ethylene Oxide and Breaking the Gel with Trialkylaluminum A diinitiator solution was prepared by adding s-butyllithium to a solution of diisopropenyl benzene in cyclohexane and ether. The polymerization was carried out in a 1-gallon stainless steel autoclave which was heated by means of a external jacket and a heated water circulation bath. The polymerization was carried out at a temperature of about 20° C. to 40° C., adjusting charges for intended solids, according to the following procedure: 1445 grams of cyclohexane, 185 grams of diethyl ether, and 200 grams of 1,3-butadiene were charged to the reactor and allowed to equilibrate to the desired temperature. All charges were made from pressure vessels or bombs under nitrogen. 172.41 grams of initiator solution (0.05 moles of diinitiator, 0.10 moles of lithium) were then added from a sample bomb. The temperature of the polymerization solution rose from 21.7° C. to 40° C. over a 43 minute period. In anionic polymerization, the number average molecular weight is determined by the molar ratio of monomer to initiator. In general, this ratio was chosen to produce a polymer, for the experiment in Table 1, with a number average molecular weight of about 4000 AMU. Before the addition of the ethylene oxide, the reactor stirrer speed was increased to 1000 rpm. We then pressured 30.8 grams of ethylene oxide, at 40° C., into the reactor from a bomb. After addition of the ethylene oxide the stirrer almost stopped, indicating formation of gel. Attempts to remove any material from the sample port did not succeed. At an applied pressure of greater than 50 psi, no flow was observed suggesting that the yield stress of the material was in greater than 0.4 psi. We allowed the ethylene oxide to react 1 hour. We then added 69.2 grams of IM triethylaluminum solution to the reactor and allowed it to stir for 23 minutes. The material in the reactor was no longer gel as evidenced by our ability to remove samples easily from the reactor sampling port. The material was removed from the reactor into 20% wt. aqueous $H_3PO_4$ which was used to remove lithium and aluminum from the solution.

Example 2

Representative Procedure for Preparation of a Diinitiated Butadiene Polymer at 10% Solids in a 2 l. Glass Autoclave, Caping with Ethylene Oxide, and Breaking the Gel.

Diinitiator solutions were prepared by adding s-butyllithium to a solution of diisopropenyl benzene in cyclohexane and ether. The active concentration of the initiator was determined to be 0.47 N by titration. The polymerizations were carried out in a 2 liter Buchi glass autoclave which made any color or viscosity changes easy to observe. Unless otherwise specified, polymerizations were carried out at a temperature of about 35° C. to 40° C., adjusting charges for intended solids, according to the following procedure: 590 grams of cyclohexane and 100 grams of diethyl ether were charged to the reactor and allowed to equilibrate to the desired temperature. 100 grams of butadiene were added. 83 grams of initiator solution were then added from a sample bomb, resulting in a temperature increase of about 10° C. to 20° C. The reactor contents initially took on the red/orange color of the initiator solution, changing to yellow/orange and increasing in viscosity as the polymerization progressed. In anionic polymerization, the number average molecular weight is determined by the molar ratio of monomer to initiator. In general, this ratio was chosen to produce polymers on a number average molecular weight of about 4,000 AMU. A bomb containing 2.2 grams of ethylene oxide (EO) was connected to the reactor and a bomb containing 34.6 grams of a 16.5% wt. triethylaluminum solution was attached to it. The valves of the sample bombs were then opened sequentially, starting at the valve closest to the reactor, so that the EO was added first, followed very rapidly by the alkyl aluminum solution. Reaction with EO is very fast, so gel was observed to form. This gel broke very rapidly, yielding a pale yellow, freely flowing, low viscosity solution. The yield stress was less than 1 psi, likely less than 0.1 psi. Methanol was added after 1 hour to terminate the reaction. Details of this and other similar experiments are summarized in Table 1.

TABLE 1

Synthesis Conditions for Preparation of Diinitiated Butadiene Polymers, Capping with EO, Followed by Addition of TEA to Break the Gel.

| Sample # | Poly solids | DiLi | [DiLi] (N) | RLi | $R_3Al$ | TEA:Li | Capping Reaction $t_{1250}$ (min)[1] | EO/Li |
|---|---|---|---|---|---|---|---|---|
| 21452-179 | 10% | 173 | 0.35 | s-BuLi | TEA | 1:1 | 60 | 7.0 |
| 22930-83C | 10% | 145 | 0.47 | s-BuLi | TEA | 1:1 | 30 | 1.20 |
| 22930-34B | 10% | 145 | 0.47 | s-BuLi | TEA | 1:1 | 30 | 1.16 |

[1]Time interval between addition of TEA and addition of methanol.

Example 3

Representative Procedure for Preparation of a Diinitiated Butadiene Polymer at 10% Solids in a 1-Gallon Stainless Steel Autoclave with Trialkylaluminum Present During the Polymerization This polymer was made essentially as the polymer in the Example 2 with the exception that 0.5 moles of triethylaluminum per mole of lithium were present from the beginning of the polymerization. 28.07 grams of 25.4% triethylaluminum in hexane was mixed with 232 grams of diinitiator made as in the previous example. This mixture was added to the reactor which contained proper charges of cyclohexane, diethoxypropane (DEP-0.4 grams) diethylether, and butadiene. Viscosity results for the polymer sample are in Table 5.

TABLE 1.5

Synthesis Conditions for Preparations of Diinitiated Butadiene Polymer with Trialkylaluminum Present during Polymerization, then Capping with EO

| Sample # | Poly solids | DiLi | [DiLi] (N) | RLi | $R_3Al$ | TEA:Li | Capping Reaction $t_{1250}$ (min)[1] | EO/Li | DEP |
|---|---|---|---|---|---|---|---|---|---|
| 23749-121 | 10% | 23749-117 | 0.42 | s-BuLi | TEA | 0.5:1 | Length of poly | 1.4/1 | Y |

Example 4

Representative Procedure for Preparation of a Diinitiated Butadiene Polymer at 20% Solids in a 1-Gallon Stainless Steel Autoclave and Capping with EO after Adding Trialkyaluminum. (23749-113)

A diinitiator solution was prepared by adding s-butyllithium to a solution of diisopropenyl benzene in cyclohexane and ether. The active concentration of the initiator was determined to be 0.42 N by titration. The polymerizations were carried out in a 1-gallon stainless steel autoclave. Temperature control for the autoclave was provided by a water bath which circulated water through its external jacket. In addition, for these experiments, a chilled water circulator set at 5° C. was used to cool the autoclave as necessary. Unless otherwise specified, polymerizations were carried out at a temperature of about 35° C. to 40° C., adjusting charges for intended solids, according to the following procedure: 973 grams of cyclohexane, 120 grams of diethyl ether. In this experiment, and in others as noted in Table 2, we added 0.4 grams of 1,2-diethoxypropane (DEP) in 20 grams of cyclohexane. We then charged 200 grams of butadiene (one-half of the final charge) and we allowed the autoclave to equilibrate to the desired temperature. 464 grams of initiator solution was then added from a sample bomb. In anionic polymerization, the number average molecular weight is determined by the molar ratio of monomer to initiator. In general, this ratio was chosen to produce polymers, for the experiments in Table 2, with a number average molecular weight of about 3200 AMU. We used the chiller to maintain a temperature near 40° C. throughout the polymerization. After 45 minutes the reactor temperature was 40.5° C. and we used the chiller to bring it down to 31.4° C. We added 200 grams more of butadiene. The polymerization exothermed to 56° C. in spite of constant chilling. After 90 minutes of polymerization the reactor temperature was 40.2° C. and we added 173 grams of 16.5% wt. triethylaluminum solution to the reactor, and then allowed it to stir for 15 minutes. We then added 13.9 grams of ethylene oxide to the reactor and allowed it to react for 1 hour. The solution was free flowing as evidenced by the fact we could remove samples from the sample port. Methanol was added to terminate the reaction. Details of this and other experiments are summarized in Table 2.

Example 5

Representative Procedure for Preparation of a Diinitiated Butadiene Polymer at 20% Solids in a 2 l. Glass Autoclave and Capping with EO after Adding Trialkyaluminuni.

Diinitiator solutions were prepared by adding s-butyllithium to a solution of diisopropenyl benzene in cyclohexane and ether. The active concentration of the initiator was determined to be 0.48 N by titration. The polymerizations were carried out in a 2 liter Buchi glass autoclave which made any color or viscosity changes easy to observe. Unless otherwise specified, polymerizations were carried out at a temperature of about 35° C. to 40° C., adjusting charges for intended solids, according to the following procedure: 350 grams of cyclohexane and 100 grams of diethyl ether were charged to the reactor and allowed to equilibrate to the desired temperature. 100 grams of butadiene were added. 203 grams of initiator solution was then added from a sample bomb, resulting in a temperature increase of about 10° C. to 20° C. After about 30 to 40 minutes, another 50 grams of butadiene was added. A third 50 g. aliquot was added after an additional 15 to 20 minutes. After a total reaction time of about 90 to 120 minutes (estimated to be about 8 to 10 half-lives), 57 grams of 25% wt. triethylaluminum solution was added, and allowed to react with the living chain ends for 15 minutes. The reaction was exothermic enough to raise the temperature a few degrees. The yellow color of the polymer anion persisted, but the solution viscosity decreased noticeably, especially at higher polymerization solids. After 15 minutes, 6 grams of ethylene oxide charge was added and flushed in with about 44 grams of cyclohexane from a bomb attached above it, as described in the previous example, resulting in a temperature increase of a few degrees and a decrease in the color of the solution, but no increase in the viscosity. After 30 minutes, methanol was added to terminate the reaction. Details of this and other experiments are summarized in Table 2.

cyclohexane and ether. The active concentration of the initiator was determined to be 0.44 N by titration. The polymerizations were carried out in a 2 liter Buchi glass autoclave which made any color or viscosity changes easy to observe. Unless otherwise specified, polymerizations were carried out at a temperature of about 35° C. to 40° C., adjusting charges for intended solids, according to the following procedure: 590 grams of cyclohexane and 100 grams of diethyl ether were charged to the reactor and allowed to equilibrate to the desired temperature. 100 grams of butadiene were added. 88.6 grams of initiator solution was then added from a sample bomb, resulting in a temperature increase of about 10° C. to 20° C. The reactor contents initially took on the red/orange color of the initiator solution, changing to yellow/orange and increasing in viscosity as the polymerization progresses. Two bombs, one containing 2.4 grams of EO and the other 34.6 grams of an approximately 16.5% wt. solution of triethylaluminum

TABLE 2

Synthesis Conditions for Preparation of Diinitiated Butadiene Polymers and Capping with EO After Addition of Trialkylaluminum.

| Sample# | Poly | | | Capping Reaction | | | | | |
| --- | --- | --- | --- | --- | --- | --- | --- | --- | --- |
| | solids | DiLi | [DiLi] (N) | RLi | $R_3Al$ | TEA:Li | $t_{TXD}$ (min) | EO/Li | DEP |
| 23749-75 | 5% | 23749-33 | 0.48 | s-BuLi | None | 0:1 | na | 1.49 | Y |
| 23749-79 | 5% | 23749-33 | 0.48 | s-BuLi | TEA | 1:1 | 15 | 1.34 | Y |
| 23749-81 | 5% | E6253S | 0.56 | s-BuLi | TEA | 0.67:1 | 15 | 1.44 | Y |
| 23749-83 | 5% | E6253S | 0.56 | s-BuLi | TEA | 0.33:1 | 15 | 1.44 | Y |
| 21452-175 | 10% | 21452-173 | 0.35 | s-BuLi | TEA | 1:1 | 15 | 1.26 | N |
| 21452-185 | 10% | 21452-185 | (1) | s-BuLi | None | 0:1 | na | 4.4 | N |
| 21452-189 | 30% | 21452-189 | (1) | s-BuLi | None | 0:1 | na | 3.3 | N |
| 23749-85 | 10% | E6253S | 0.56 | s-BuLi | TEA | 1:1 | 15 | 1.47 | Y |
| 23749-87 | 10% | E6253S | 0.56 | s-BuLi | TEA | 0.67:1 | 15 | 1.58 | Y |
| 23749-89 | 10% | E6253S | 0.56 | s-BuLi | TEA | 0.33:1 | 15 | 1.52 | Y |
| 23749-97 | 30% | E6269S | 0.52 | s-BuLi | TEA | 1:1 | 15 | 1.6 | Y |
| 23749-101 | 30% | E6269S | 0.52 | s-BuLi | TEA | 0.67:1 | 15 | 1.56 | Y |
| 23749-113 | 20% | 23749-111 | 0.42 | s-BuLi | TEA | 1:1 | 15 | 1.26 | Y |
| 22930-99A | 20% | 167 | 0.49 | t-BuLi | TEA | 1:1 | 15 | 3.08 | N |
| 22930104C | 20% | 7 | 0.57 | t-BuLi | TEA | 1:1 | 15 | 2.43 | N |
| 22930-105A | 20% | 7 | 0.57 | t-BuLi | TEA | 1:1 | 15 | 3.21 | N |
| 22930-107B | 20% | 9 | 0.5 | t-BuLi | TEA | 1:1 | 15 | 2.41 | N |
| 22930-91A | 10% | 149 | 0.38 | s-BuLi | TMAL[1] | 1:1 | 15 | 3.01 | N |
| 22930-102A | 20% | 199 | 0.52 | s-BuLi | TEA | 1:1 | 15 | 2.58 | N |
| 22930-103A | 20% | 191[2] | 0.61 | s-BuLi | TEA | 1:1 | 15 | 2.54 | N |
| 22930-109B | 10% | 6086 | 0.57 | s-BuLi | TEA | 1:1 | 15 | 1.47 | N |
| 23838-13 | 10% | 33 | 0.48 | s-BuLi | TEA | 1:1 | 15 | 1.38 | N |
| 23838-16 | 10% | 33 | 0.48 | s-BuLi | TEA | 1:1 | 15 | 1.58 | N |
| 23838-20 | 10% | 33 | 0.48 | s-BuLi | TEA | 1:1 | 15 | 1.32 | N |
| 23838-22 | 10% | 33 | 0.48 | s-BuLi | TEA | 1:1 | 15 | 1.52 | N |
| 23838-24 | 20% | 33 | 0.48 | s-BuLi | TEA | 1:1 | 15 | 1.37 | N |
| 23838-26 | 10% | 33 | 0.48 | s-BuLi | TEA | 1:1 | 15 | 1.35 | N |
| 23838-28 | 10% | 33 | 0.48 | s-BuLi | TEA | 1:1 | 15 | 1.47 | N |
| 23838-30 | 10% | 6253 | 0.52 | s-BuLi | TEA | 1:1 | 15 | 1.38 | N |
| 23838-32 | 10% | 6253 | 0.52 | s-BuLi | TEA | 1:1 | 15 | 1.24 | N |
| 23838-34 | 10% | 6253 | 0.52 | s-BuLi | TEA | 1:1 | 15 | 1.59 | N |
| 23838-36 | 10% | 6253 | 0.52 | s-BuLi | TEA | 1:1 | 15 | 1.17 | N |
| 23838-38 | 10% | 6253 | 0.52 | s-BuLi | TEA | 1:1 | 15 | 1.29 | N |
| 23838-40 | 10% | 6253 | 0.52 | s-BuLi | TEA | 1:1 | 15 | 1.39 | N |
| 23838-43 | 10% | 6253 | 0.52 | s-BuLi | TEA | 1:1 | 15 | 1.38 | N |

(1) made in situ in autoclave
[1]Triethylaluminum
[2]Triethylamine used in initiator synthesis instead of DEE.

Example 6

Representative Procedure for Preparation of a Diinitiated Butadiene Polymer at 10% Solids in a 2 l. Glass Autoclave and Reaction with a Mixture of EO and Trialkyaluminum.

Diinitiator solutions were prepared by adding t-butyllithium to a solution of diisopropenyl benzene in (TEA) in hexane, were attached to the reactor as described above. When the polymerization was complete, the TEA solution was pressured into the bomb containing the EO and allowed to interact for about one minute. The contents were then pressured into the autoclave and allowed to react with the living chain ends for 30 minutes. While the heat of mixing of the EO and TEA was appreciable, $^1$H NMR of the mixture suggested that the reaction between EO and TEA was relatively slow under these conditions. As in the previous example, no increase in viscosity was observed on addition of the mixture and the color faded to pale yellow, indicative of capping. After 30 minutes, methanol was added to terminate the reaction. Details of this and other experiments are summarized in Table 3.

TABLE 3

Synthesis Conditions for Preparation of Diinitiated Butadiene Polymers and Capping with a Mixture of EO and TEA.

| Sample # | solids | Poly DiLi | [DiLi] (N) | RLi | $R_3Al$ | TEA:Li | $t_{1250}$ (min)[1] | EO/Li |
|---|---|---|---|---|---|---|---|---|
| 90A | 10% | 149 | 0.38 | sBuLi | TEA | 1:1 | 1 | 2.3 |
| 93B | 10% | 157[2] | 0.44 | tBuLi | TEA | 1:1 | 1 | 2.40 |
| 98A | 15% | 167 | 0.49 | tBuLi | TEA | 1:1 | 1 | 2.63 |
| 98B | 20% | 167 | 0.49 | tBuLi | TEA | 1:1 | 1 | 2.58 |

[1]Time TEA and EO allowed to mix before addition to autoclave.
[2]Triethylamine used in initiator synthesis instead of DEE.

Yield Stress and Viscosity Measurements

Yield stress and viscosity measurements for the polymers in Tables 4–7 were carried out using a modified melt flow device, and a steel tube attached to the polymerization reactor.

Yield Stress Measurement

We measured yield stress using a modified melt flow device, which consisted of a barrel, plunger, die, and several standard weights. We placed the apparatus into a nitrogen-filled glove box. The atmosphere in the glove box was monitored by sensors, and had <10 ppm moisture and oxygen. To measure a sample, we removed a sample of polymer (gel) from the autoclave into a nitrogen-purged bottle, then took the sample into the glove box. We placed the die into the melt flow barrel, placed a small quantity of polymer into the barrel, put in the plunger, then added weight until the material just began to extrude from the die. The amount of weight necessary to cause flow was used to calculate the yield stress as follows:

w=stress (dynes/cm$^2$)—this value is yield stress when the weight just causes polymer flow through the die
$R_d$=die radius (cm)=0.104775 cm
W=weight added to plunger (gm)
$L_d$=die length (cm)=0.8001 cm
PD=plunger diameter=0.9525 cm
w=($R_d$*(W/π*PD/2)*980.6 dynes/gram)/(2$L_d$)

Viscosity Measurement

We measured viscosity using a tube attached to the polymerization reactor. The tube was made of 316 stainless steel, 0.476 cm in diameter, and 6.19 cm in length, and was attached to the drain port of the reactor. Polymer samples were taken through the tube into tared, nitrogen-purged bottles that were vented with a needle. The sample was timed, then weighed, and the viscosities were calculated as follows:

$R_c$=capillary/tube radius (cm)
$L_c$=capillary/tube length (cm)
Q=(grams polymer collected/second)/(polymer solution density)
Polymer solution density=0.78 grams/cm$^3$
A=capillary/tube cross-section area=π*(0.149 cm)$^2$= 0.0697 cm$^2$
ΔP=psig on reactor converted as follows:
(psig*445000)/(2.54)$^2$=dynes/cm$^2$
η=($R_c^2$/8($V_z$))*(ΔP/$L_c$)

TABLE 4

Yield Stress and Rheology Data for 5 wt % Solutions of Dilithium Initiated Diol Polymers. The Affect of Added Trialkylaluminum Reagent on Properties.

| Sample # | MW | $R_3Al$ (type) | $R_3Al$:Li (mol:mol) | Order of Addition | Yield Stress (psi) | Viscosity (Shear Rate) centipoise (1/sec) |
|---|---|---|---|---|---|---|
| 23749-79 | 4,405 | TEA | 1:1 | Before EO | <1 (BDL) | <100 (BDL) |
| 23749-81 | (*)2,896 | TEA | 0.67:1 | Before EO | <1 (BDL) | 213(6,856) |
|  |  |  |  |  |  | 141(8,634) |
|  |  |  |  |  |  | 114(10,636) |
| 23749-83 | (*)2,660 | TEA | 0.33:1 | Before EO | <1 (BDL) | 306(7,968) |
|  |  |  |  |  |  | 218(11,151) |
|  |  |  |  |  |  | 218(11,175) |
| 23749-75 | 3,004 | None | 0:1 | None Added | Gel (visual) | NA |

In most instances, molecular weight (MW) was measured using an Nuclear Magnetic Resonance (NMR) technique. Values deonted with (*) were assayed using a Gel Permeation Chromatograph (GPC) method. The column labeled $R_3Al$ (type) is indicating the nature of the aluminum reagent that was used to mitigate the tendency of the product to gel, where TEA=triethylaluminum. The column labeled $R_3Al$:Li is noting the stoichiometric relationship between the amount of Al reagent that was used as it related to the number of polymer chain ends in the sample. At a 1:1 ratio, there is an Al reagent for every polymer chain end. "Order of Addition" is an indication of the point in the synthesis process where the Al reagent was added. The choices were 1) "After EO" which is also after the gel had already formed, 2) "With EO" which is the case where the EO and the Al reagent are premixed before addition to the polymer (this method avoids the gel forming step) 3) "Before EO" which is after polymerzatinon is over and before the capping agent was added; this process avoids the gel forming step), and 4) "Before Bd" which is before the butadiene monomer was added; this method avoids the gel forming step). "Yield Stress" was measured on samples having a value greater than 1 psi. Samples having lower, to include 0 psi, yield stress were too weak to be assayed by this method and were noted as Below Detectable Limit ("BDL"). Some samples clearly contained gel based on visual observation but were not assayed using the rheometer technique noted in the text. These samples were labeled "Gel (visual)". Where viscosity could be measured, it was reported in combination with the shear rate as "Viscosity (Shear Rate)." Samples with very low viscosity (<100 cps) were visually observed to be "Below the Detection Limit" and were reported as "BDL". Most measurements were at 40° C. NA=Not Analyzed by this method.

TABLE 5

Yield Stress and Rheology Data for 10 wt % Solutions of Dilithium Initiated Diol Polymers. The Affect of Added Trialkylaluminum Reagent on Properties.

| Sample# | MW | R₃Al (type) | R₃Al:Li (mol:mol) | Order of Addition | Yield Stress (psi) | Viscosity (Shear Rate) centipoise (1/sec) |
|---|---|---|---|---|---|---|
| 23749-85 | 4,292 | TEA | 1:1 | Before EO | (1) | 1,977 (1,234) |
| | | | | | | 2,033 (1,200) |
| | | | | | | 1,503 (1,622) |
| | | | | | | 1,839 (1,326) |
| 23749-87 | 3,459 | TEA | 0.67:1 | Before EO | <1 (BDL) | 279 (4363) |
| | | | | | | 926 (1316) |
| | | | | | | 392 (3109) |
| 23749-121 | 3646 | TEA | 0.5:1 | Before Bd | <1 (BDL) | 64,358 (68) |
| | | | | | | 64,041 (68) |
| 23749-89 | (*)3,296 | TEA | 0.33:1 | Before EO | (1) | 26,948 (231) |
| | | | | | | 22,087 (281) |
| | | | | | | 16,373 (507) |
| | | | | | | 15,427 (538) |
| | | | | | | 5,592 (2,226) |
| | | | | | | 5,195 (2,396) |
| 21452-185 | 6,991 | None | 0:1 | None Added | 453 | 1,422,000 (21) |
| | | | | | 5.36 | 1,181,000 (30) |
| 22930-83C | 3,700 | TEA | 1:1 | After EO | <1 (BDL) | <100 |
| 22930-84B | 3,790 | TEA | 1:1 | After EO | <1 (BDL) | <100 |
| 22930-91A | 3,800 | TMAL | 1:1 | After EO | <1 (BDL) | <100 |
| 22930-109B | 4,358 | TEA | 1:1 | After EO | <1 (BDL) | <100 |
| 23838-13 | 2,957 | TEA | 1:1 | After EO | <1 (BDL) | <100 |
| 23838-16 | 4,018 | TEA | 1:1 | After EO | <1 (BDL) | <100 |
| 23838-20 | 3,887 | TEA | 1:1 | After EO | <1 (BDL) | <100 |
| 23838-22 | 4,169 | TEA | 1:1 | After EO | <1 (BDL) | <100 |
| 23838-26 | 3,940 | TEA | 1:1 | After EO | <1 (BDL) | <100 |
| 23838-28 | 4,020 | TEA | 1:1 | After EO | <1 (BDL) | <100 |
| 23838-30 | 4,013 | TEA | 1:1 | After EO | <1 (BDL) | <100 |
| 23838-32 | 3,619 | TEA | 1:1 | After EO | <1 (BDL) | <100 |
| 23838-34 | 4,622 | TEA | 1:1 | After EO | <1 (BDL) | <100 |
| 23838-36 | 3,414 | TEA | 1:1 | After EO | <1 (BDL) | <100 |
| 23838-38 | 3,757 | TEA | 1:1 | After EO | <1 (BDL) | <100 |
| 23838-40 | 4,050 | TEA | 1:1 | After EO | <1 (BDL) | <100 |
| 23838-43 | 4,009 | TEA | 1:1 | After EO | <1 (BDL) | <100 |
| 22930-90A | 3,947 | TEA | 1:1 | With EO | <1 (BDL) | <100 |
| 22930-93B | 4,358 | TEA | 1:1 | With EO | <1 (BDL) | <100 |

(1) Flowable at pressure at which viscosity measurements were taken (last column after viscosities). In most instances, molecular weight (MW) was measured using an Nuclear Magnetic Resonance (NMR) technique. Values denoted with (*) were assayed using a Gel Permeation Chromatograph (GPC) method. The column labeled R₃Al (type) is indicating the nature of the aluminum reagent that was used to mitigate the tendency of the product to gel where TEA=triethylaluminum and TMAL=trimethylaluminum. The column labeled R₃Al:Li is noting the stoichiometric relationship between the amount of Al reagent that was used as it related to the number of polymer chain ends in the sample. At a 1:1 ratio, there is an Al reagent for every polymer chain end. "Order of Addition" is an indication of the point in the synthesis process where the Al reagent was added. The choices were 1) "After EO" which is also after the gel had already formed, 2) "With EQ" which is the case where the EO and the Al reagent are premixed before addition to the polymer (this method avoids the gel forming step), 3) "Before EO" which is after polymerization is over and before the capping agent was added (this process avoids the gel forming step), and 4) "Before Bd" which is before the butadiene monomer was added (this method avoids the gel forming step). "Yield Stress" was measured on samples having a value greater than 1 psi. Samples having lower, to include 0 psi yield stress were too weak to be assayed by this method and were noted as Below Detectable Limit ("BDL"). Some samples clearly contained gel based on visual observation but were not assayed using the rheometer technique noted in the text. These samples were labeled "Gel (visual)". Where viscosity could be measured, it was reported in combination with the shear rate as "Viscosity(Shear Rate)." Samples with very low viscosity (<100 cps) were visually observed to be "Below the Detection Limit" and were reported as "BDL". Most measurements were at 40° C. NA=Not Analyzed by this method. The viscosity of samples prepared in the glass autoclave was estimated from the approximate time it took to recover a sample from a DOPAC sample port. About 25 grams of sample could be collected in about 5 seconds with a head pressure of about 30 psig. The sampler is basically a sample needle, a vent needle, and a cage for the sample bottle. Sample bottles are capped with a septum. Pushing the bottle into the cage forces both needles through the septum. Based on a drawing provided by the manufacturer, the sampler was modeled as a capillary, 1.57 inches in length an 0.053 inches in diameter. None of these values were measured with high precision. The value of <100 cp. should be taken as an order of magnitude estimate.

TABLE 6

Yield Stress and Rheology Data for 20 wt % Solutions of Dilithium Initiated Diol Polymers. The Affect of Added Trialkylaluminum Reagent on Properties.

| Sample# | MW | $R_3Al$ (type) | $R_3Al$:Li (mol:mol) | Order of Addition | Yield Stress (psi) | Viscosity (Shear Rate) centipoise (1/sec) |
|---|---|---|---|---|---|---|
| 23749-113 | 3,042 | TEA | 1:1 | Before EO | <1 (BDL) | NA |
| 22930-99A | 4,639 | TEA | 1:1 | Before EO | <1 (BDL) | <100 |
| 22930-104C(*) | 4,669 | TEA | 1:1 | Before EO | <1 (BDL) | <100 |
| 22930-105A | 3,970 | TEA | 1:1 | Before EO | <1 (BDL) | <100 |
| 22930-107B | 4,013 | TEA | 1:1 | Before EO | <1 (BDL) | <100 |
| 22930-102A | 4,859 | TEA | 1:1 | Before EO | <1 (BDL) | <100 |
| 22930-103A(*) | 5,000 | TEA | 1:1 | Before EO | <1 (BDL) | <100 |
| 23838-24 | 4,268 | TEA | 1:1 | Before EO | <1 (BDL) | <100 |
| 22930-98B | 4,358 | TEA | 1:1 | With EO | <1 (BDL) | <100 |

(1) Flowable at pressure at which viscosity measurements were taken (last column after viscosities). In most instances, molecular weight (MW) was measured using an Nuclear Magnetic Resonance (NMR) technique. Values denoted with (*) were assayed using a Gel Permeation Chromatograph (GPC) method. The column labeled $R_3Al$ (type) is indicating the nature of the aluminum reagent that was used to mitigate the tendency of the product to gel where TEA=triethylaluminum and TMAL=trimethylaluminum. The column labeled $R_3Al$:Li is noting the stoichiometric relationship between the amount of Al reagent that was used as it related to the number of polymer chain ends in the sample. At a 1:1 ratio, there is an Al reagent for every polymer chain end. "Order of Addition" is an indication of the point in the synthesis process where the Al reagent was added. The choices were 1) "After EO" which is also after the gel had already formed, 2) "With EO" which is the case where the EO and the Al reagent are premixed before addition to the polymer (this method avoids the gel forming step), 3) "Before EO" which is after polymerization is over and before the capping agent was added (this process avoids the gel forming step), and 4) "Before Bd" which is before the butadiene monomer was added (this method avoids the gel forming step). "Yield Stress" was measured, on samples having a value greater than 1 psi. Samples having lower, to include 0 psi, yield stress were too weak to be assayed by this method and were noted as Below Detectable Limit ("BDL"); some samples clearly contained gel based on visual observation but were not assayed using the rheometer technique noted in the text. These samples were labeled "Gel (visual)". Where viscosity could be measured, it was reported in combination with the shear rate as "Viscosity (Shear Rate)." Samples with very low viscosity (<100 cps) were visually observed to be "Below the Detection Limit" and were reported as "BDL". Most measurements were at 40° C. NA=Not Analyzed by this method. The viscosity of samples prepared in the glass autoclave was estimated from the approximate time it took to recover a sample from a DOPAC sample port. About 25 grams of sample could be collected in about 5 seconds with a head pressure of about 30 psig. The sampler is basically a sample needle, a vent needle, and a cage for the sample bottle. Sample bottles are capped with a septum. Pushing the bottle into the cage forces both needles through the septum. Based on a drawing provided by the manufacturer, the sampler was modeled as a capillary, 1.57 inches in length an 0.053 inches in diameter. None of these values were measured with high precision. The value of <100 cp. should be taken as an order of magnitude estimate.

TABLE 7

Yield Stress and Rheology Data for 30 wt % Solutions of Dilithium Initiated Diol Polymers. The Affect of Added Trialkylaluminum Reagent on Properties.

| Sample# | MW | $R_3Al$ (type) | $R_3Al$:Li (mol:mol) | Order of Addition | Yield Stress (psi) | Viscosity (Shear Rate) centipoise (1/sec) |
|---|---|---|---|---|---|---|
| 23749-97 | 3642 | TEA | 1:1 | Before EO | <1 (BDL) | 565 (3828) |
| 23749-101 | 3469 | TEA | 0.67:1 | Before EO | <1 (BDL) | 187 (8486) |
|  |  |  |  |  |  | 185 (16613) |
| 21452-189(*) | 3,365 | None | 0:1 | None Added | 11.03 | 10,570,000 (7) |
|  |  |  |  |  | 11.86 | 7,105,900 (11) |

In most instances, molecular weight (MW) was measured using an Nuclear Magnetic Resonance (NMR) technique. Values denoted with (*) were assayed using a Gel Permeation Chromatograph (GPC) method. The column labeled $R_3Al$ (type) is indicating the nature of the aluminum reagent that was used to mitigate the tendency of the product to gel, where TEA=triethylaluminum. The column labeled $R_3Al$:Li is noting the stoichiometric relationship between the amount of Al reagent that was used as it related to the number of polymer chain ends in the sample. At a 1:1 ratio, there is an Al reagent for every polymer chain end. "Order of Addition" is an indication of the point in the synthesis process where the Al reagent was added. The choices were 1) "After EO" which is also after the gel had already formed, 2) "With EO" which is the case where the EO and the Al reagent are premixed before addition to the polymer (this method avoids the gel forming step) 3) "Before EO" which is after polymerization is over and before the capping agent was added; this process avoids the gel forming step), and 4) "Before Bd" which is before the butadiene monomer was added; this method avoids the gel forming step). "Yield Stress" was measured on samples having a value greater than 1 psi.

Samples having lower, to include 0 psi, yield stress were too weak to be assayed by this method and were noted as Below Detectable Limit ("BDL"). Some samples clearly contained gel based on visual observation but were not assayed using the rheometer technique noted in the text. These samples were labeled "Gel (visual)". Where viscosity could be measured, it was reported in combination with the shear rate as "Viscosity (Shear Rate)." Samples with very low viscosity (<100 cps) were visually observed to be "Below the Detection Limit" and were reported as "BDL". Most measurements were at 40° C. NA=Not Analyzed by this method.

Comparative Example 7

Polymerization in a 2 l. Glass Autoclave and Capping with EO after Adding Diethylzinc or Dibutylmagnesium.

Butadiene was polymerized at 20% solids using an initiator prepared from t-butyllithium and diisopropenyl benzene. After the polymerization was complete, one mole of diethylzinc was added per mole of lithium. As with triallylaluminum, the viscosity of the living polymer solution decreased, while the color remained essentially unchanged. After 15 minutes, ethylene oxide was added (about 20% over the stoichiometric requirement). The reactor contents immediately gelled. Within seconds, the reactor could not be stirred. Identical results were obtained with dibutylmagnesium. These metal alkyls appear to form complexes with the living chain ends that are capable of adding EO, but fail to prevent the resulting alkoxide from forming a gel.

We claim:

1. A process for making gel-free functionalized anionic polymers, comprising:
    (a) anionically polymerizing at least one monomer with a multi-alkali metal initiator in a hydrocarbon solvent,
    (b) functionalizing polymer chain ends with a capping agent that reacts with the polymer chain ends such that strongly associating chain ends are formed wherein a strongly associating polymer gel is formed, and
    (c) adding a trialkyl aluminum compound to the polymer gel.

2. The process of claim 1 wherein the multi-alkali metal initiator is a dilithium initiator.

3. The process of claim 2 wherein the multi-alkali metal initiator is formed from compounds selected from the group consisting of diisopropenyl benzene, diphenylethylene, styrene, butadiene, isoprene, 1,3-bis(1-phenylethenyl) benzene and 1,4-bis(1-phenylethenyl)benzene.

4. The process of claim 1 wherein the trialkyl aluminum compound comprises alkyl groups having from 1 to 10 carbon atoms.

5. The process of claim 1 wherein the capping agent forms alkali metal-O or alkali metal-N bonds.

6. The process of claim 1 wherein at least 0.1 mole of the capping agent is added per mole of the polymer chain ends.

7. The process of claim 1 wherein the trialkyl aluminum compound is added to the polymer chain ends in at least a 0.1:1 molar ratio.

8. The process of claim 1 wherein the monomer is selected from the group consisting of butadiene, isoprene, styrene, epoxides, lactones, acrylates, methacrylates, and cyclic carbonates.

9. The process of claim 8 wherein the monomer is butadiene or isoprene.

10. The process of claim 9 wherein the monomer is butadiene.

11. The process of claim 8 wherein the polymer is a polydiene diol.

12. The process of claim 10 wherein the polymer is a polybutadiene diol.

13. A gel-free process for making functionalized anionic polymers, comprising:
    (a) anionically polymerizing at least one monomer with a multi-alkali metal initiator in a hydrocarbon solvent,
    (b) adding a trialkyl aluminum compound, and
    (c) functionalizing polymer chain ends with a capping agent which reacts with the polymer chain ends, and
    (d) wherein the trialkyl aluminum compound is added anytime before or at the same time as the capping agent.

14. The process of claim 13 wherein the multi-alkali metal initiator is a dilithium initiator.

15. The process of claim 14 wherein the multi-alkali metal initiator is formed from compounds selected from the group consisting of diisopropenyl benzene, diphenylethylene, styrene, butadiene, isoprene, 1,3-bis(1-phenylethenyl) benzene and 1,4-bis(1-phenylethenyl)benzene.

16. The process of claim 13 wherein the trialkyl aluminum compound comprises alkyl groups having from 1 to 10 carbon atoms.

17. The process of claim 13 wherein the capping agent forms alkali metal-O or alkali metal-N bonds.

18. The process of claim 13 wherein at least 0.1 mole of the capping agent is added per mole of the polymer chain ends.

19. The process of claim 13 wherein the trialkyl aluminum compound is added to the polymer chain ends in at least a 0.1:1 molar ratio.

20. The process of claim 13 wherein the monomer is selected from the group consisting of butadiene, isoprene, styrene, epoxides, lactones, acrylates, methacrylates, and cyclic carbonates.

21. The process of claim 20 wherein the monomer is butadiene or isoprene.

22. The process of claim 21 wherein the monomer is butadiene.

23. The process of claim 21 wherein the polymer is a polydiene diol.

24. The process of claim 22 wherein the polymer is a polybutadiene diol.

25. A gel-free process for making a functionalized polymer from an unfunctionalized polymer, sequentially comprising:
    (a) reacting an unfunctionalized polymer with lithium alkyl in the presence of a promoter to form a lithiated polymer,
    (b) reacting the lithiated polymer with a capping agent that reacts with lithiated sites on the polymer such that strongly associating chain sites are formed wherein a strongly associating gel is formed, and
    (c) adding a trialkyl aluminum compound to the gel.

26. The process of claim 25 wherein the trialkyl aluminum compound comprises alkyl groups having from 1 to 10 carbon atoms.

27. The process of claim 25 wherein the capping agent forms alkali metal-O or alkali metal-N bonds.

28. The process of claim 25 wherein at least 0.1 mole of the capping agent is added per mole of the lithiated sites.

29. The process of claim 25 wherein a molar ratio of the trialkyl aluminum compound to the lithiated sites is at least 0.1:1.

30. A gel-free process for making a functionalized polymer, comprising:

(a) reacting an unfunctionalized polymer with an alkali metal alkyl in the presence of a promoter to form a lithiated polymer, (b) adding a trialkyl aluminum compound, and (c) reacting the lithiated polymer with a capping agent which, in the absence of the trialkylaluminum compound, would react with the lithiated polymer to form strongly associating chain sites wherein a strongly associating gel would be formed, (d) wherein the trialkyl aluminum compound is added before addition of the capping agent or at the same time as the capping agent.

31. The process of claim 30 wherein the trialkyl aluminum compound comprises alkyl groups having from 1 to 10 carbon atoms.

32. The process of claim 30 wherein the capping agent forms alkali metal-O or alkali metal-N bonds.

33. The process of claim 30 wherein at least 0.1 mole of the capping agent is added per mole of lithiated sites.

34. The process of claim 30 wherein the trialkyl aluminum compound is added to lithiated sites in at least a 0.1:1 molar ratio.

35. A gel-free process for making functionalized polymers from polymers which are already functionalized with functionality that forms strongly associating chain sites when reacted with alkali metal reagents, thereby forming a strongly associating gel, comprising:

(a) reacting a functionalized polymer with an alkali metal reagent to form a strongly associating gel, and (b) adding a trialkyl aluminum.

36. The process of claim 35 wherein the trialkyl aluminum comprises alkyl groups having from 1 to 10 carbon atoms.

37. The process of claim 35 wherein the alkali metal reagent is selected from the group consisting of lithium hydride, lithium alkyl, sodium hydride, sodium alkyl, potassium hydride, and potassium alky.

38. A gel-free process for making functionalized polymers from polymers which are already functionalized with functionality that forms strongly associating chain sites when reacted with alkali metal reagents, thereby forming a strongly associating gel, comprising:

(a) adding a trialkyl aluminum compound to a functionalized polymer, and (b) subsequently reacting the functionalized polymer with an alkali metal reagent.

39. The process of claim 38 wherein the trialkyl aluminum compound comprises alkyl groups having from 1 to 10 carbon atoms.

40. The process of claim 38 wherein the alkali metal reagent is selected from the group consisting of lithium hydride, lithium alkyl, sodium hydride, sodium alkyl, potassium hydride, and potassium alkyl.

41. A process for making gel-free functionalized anionic polymers, comprising:

anionically polymerizing at least one monomer with a multi-alkali metal initiator in a hydrocarbon solvent;

functionalizing polymer chain ends with a capping agent; and adding a trialkyl aluminum compound.

42. The process of claim 41 wherein the multi-alkali metal initiator is a dilithium initiator.

43. The process of claim 42 wherein the multi-alkali metal initiator is formed from compounds selected from the group consisting of diisopropenyl benzene, diphenylethylene, styrene, butadiene, isoprene, 1,3-bis(1-phenylethenyl) benzene and 1,4-bis(1-phenylethenyl)benzene.

44. The process of claim 41 wherein the capping agent forms alkali metal-O or alkali metal-N bonds.

45. The process of claim 41 wherein at least 0.1 mole of the capping agent is added per mole of the polymer chain ends.

46. The process of claim 41 wherein the trialkyl aluminum compound is added to the chain ends in at least a 0.1:1 molar ratio.

47. The process of claim 41 wherein the trialkyl aluminum compound is added after the capping agent.

48. The process of claim 41 wherein the monomer comprises isoprene or butadiene.

49. The process of claim 41 wherein the monomer comprises butadiene.

50. A gel-free process for making a functionalized polymer, comprising:

(a) reacting a polymer with an alkali metal alkyl in the presence of a promoter to form a lithiated polymer, (b) adding a trialkyl aluminum compound, and (c) reacting said lithiated polymer with capping agent.

51. The process of claim 50 wherein the lithiated polymer is reacted with the capping agent prior to the adding of the trialkyl aluminum compound.

52. The process of claim 50 wherein the polymer comprises polybutadiene.

53. The process of claim 6 wherein the capping agent is selected from the group comprising ethylene oxide, oxetane, carbon dioxide, sulfur trioxide and 1,5-diazabicyclohexane.

54. The process of claim 53 wherein the capping agent is ethylene oxide.

55. The process of claim 18 wherein the capping agent is selected from the group comprising ethylene oxide, oxetane, carbon dioxide, sulfur trioxide and 1,5-diazabicyclohexane.

56. The process of claim 55 wherein the capping agent is ethylene oxide.

57. The process of claim 28 wherein the capping agent is selected from the group comprising ethylene oxide, oxetane, carbon dioxide, sulfur trioxide and 1,5-diazabicyclohexane.

58. The process of claim 57 wherein the capping agent is ethylene oxide.

* * * * *